Patented Apr. 13, 1937

2,077,096

UNITED STATES PATENT OFFICE 2,077,096

MANUFACTURE OF CHROMATES

John B. Carpenter, Jr., West Roxbury, and Earl P. Stevenson, Newton, Mass., assignors to Arthur D. Little, Incorporated, Cambridge, Mass., a corporation of Massachusetts No Drawing. Application July 13, 1932, Serial No. 622,289

3 Claims. (Cl. 23—56)

This invention relates to the manufacture of chromates, particularly sodium chromate from chrome ore and an alkali such as sodium carbonate.

Sodium chromate is commercially made by roasting a mixture of chrome ore, sodium carbonate and lime in a reverberatory furnace, and leaching the resulting mass. Chrome ore consists mainly of ferrous chromite ($FeCr_2O_4$) which during the roasting operation reacts with the sodium carbonate and oxygen to form carbon dioxide, ferric oxide, and the desired sodium chromate ($Na_2CrO_4$). It is essential therefore that the roasting mixture be supplied with oxygen in ample amount; this oxygen comes from the air, and a fusing together of the roasting mixture which would hinder the access of air to any part of it would materially diminish the extent to which the reaction could proceed, and accordingly the amount of product obtained. In practice it is customary and necessary continually to rabble the roasting mixture to prevent sintering and fusing and to promote ready access of air. This operation is extremely laborious and is costly.

The present invention aims to avoid the disadvantages of roasting loose charges of the ingredients as in prior commercial practice, by providing a practical and efficient process of roasting the charge in the form of bricks, in particular avoiding the necessity for rabbling the charge as in prior commercial procedures. It was proposed many years ago to produce chromates by roasting briquetted charges, but as far as we are aware, such proposed procedures have failed to come into commercial use, apparently because less efficient than the established practice of roasting loose charges in a reverberatory furnace. We have discovered, however, that by certain improvements in the compounding and treatment of the briquetted mixtures, a procedure involving roasting the material in briquetted form may be rendered commercially practical and economical.

In the roasting of the ore and sodium carbonate in the form of bricks, due to the absence of any rabbling or stirring of the charge during roasting, the conditions are inherently more favorable to a closing of the pores or interstices of the charge by softening or fusing of the charge, particularly of the contained sodium carbonate. The economical roasting of bricks necessitates their being in stacks during the roasting operation; the weight of a stack of bricks would soon cause settling in the event of softening, thus causing the lowermost bricks to be unduly compacted and impenetrable to air. Any such effect due to softening or fusing will diminish the supply of air to the interior of the bricks and accordingly diminish the extent to which the desired oxidizing reaction can proceed. Chrome ore, in addition to its iron and chromium compounds contains various impurities, among which may be mentioned silica and alumina, which have a tendency to react with sodium carbonate at high temperatures. It will readily be apparent that in so far as the sodium carbonate is unexhausted by reaction with the chromium constituents, it will be increasingly available to react with the impurities silica and alumina. Such reaction of the sodium carbonate with the silica and alumina is undesirable, since it produces soluble sodium salts which add to the difficulty of obtaining a pure solution of the desired sodium chromate. Thus, unless special precautions are taken, dispensing with rabbling of the ingredients increases the tendency to imperfect or incomplete reaction of the chromium oxide and sodium carbonate, decreasing materially the yield of sodium chromate.

Nevertheless, the general scheme of producing sodium chromate by the roasting of bricks has important advantages which render such practice desirable if low yields can be suitably prevented; the present invention enables this to be done. Our invention renders it commercially practicable to produce sodium chromate by roasting bricks without sacrificing the chemical efficiency of the commercial rabbling procedure, and moreover, even renders possible a larger yield than is now obtainable by the processes which employ rabbling. Our invention will now be explained by way of example by describing a preferred procedure of making sodium chromate. As will now appear, our invention involves important departures from the customary practice as described above.

As a preferred initial step, a mixture of pulverized chrome ore and sodium carbonate is formed into bricks, later to be roasted. The ore should preferably be ground fine enough to pass a 100 mesh sieve; the percentage composition of one type of ore which has been found satisfactory is as follows: $Cr_2O_3$, 48.98; $SiO_2$, 5.28; $Al_2O_3$, 12.58; Fe, 13.93; MgO, 12.36.

We have discovered that in the subsequent roasting operation the completeness of reaction between the ore and sodium carbonate is increased if the bricks have a certain amount of porosity. We accordingly prefer to form the bricks with at least 30% of voids, (as measured by the voluminometer described on page 169, vol. 1, 1929, of the July 15, 1929 issue of the Analytical Edition of the Journal of Industrial & Engineering Chemistry), the percentage of voids relating to the condition of the bricks when dry; a percentage of voids of 40% is even more preferable.

The bricks may, if desired, be formed by an ordinary pressing or molding operation in which, in order to obtain the desired porosity, only sufficient pressure is applied to cause the bricks to maintain their form when subjected to the usual shocks of handling. As illustrative of the advantage of carefully forming the bricks with sufficient voids, we have found that, with a given mixture of ingredients, a pressure of 350 lbs. per square inch will make a brick approximately ½" x 2" x 3" sufficiently capable of standing shock provided the molding or forming pressure is released as soon as it reaches 350 lbs. per square inch. If all of the other conditions are maintained identical and the pressure of 350 lbs. per square inch is retained for thirty seconds, the bricks thus formed show, when roasted, a decrease in conversion of as much as 8% (based upon the sodium carbonate content) below the bricks from which pressure is released immediately upon reaching 350 lbs.

Bricks for use in our improved process may also be made by extrusion. Bricks formed in this manner are in some respects preferable to bricks formed by molding in that the extruded bricks can carry more water and require less pressure to hold their shape, and hence can be made in larger sizes and still retain a satisfactory porosity. Bricks have been extruded in the standard fire brick size (2½" x 4½" x 8½") and roasted with the resulting conversion of over 90% (based on the sodium carbonate content). An amount of mixing water equal to about 16% of the dry ingredients is suitable when making bricks of standard fire brick size by extrusion.

The exact pressures to be employed in forming the bricks either by molding or extrusion, and the amounts of water to be mixed with the ingredients in forming the bricks will, of course, depend upon the size of the bricks formed. The conditions of pressure and water content can best be regulated to control the porosity of the bricks by measuring the percentage of voids in a dry brick by the voluminometer mentioned above and then decreasing the pressure or increasing the water content, if necessary, to provide the necessary percentage of voids.

The mixture constituting these bricks includes very much less proportion of lime than in the customary prior commercial practices, and preferably no lime is included in this mixture.

We have discovered that by incorporating in the mixture a quantity of ore very much in excess of that theoretically necessary to combine with the sodium carbonate, a materially higher conversion of sodium carbonate into sodium chromate can be obtained, and the efficiency of the process thereby increased. We prefer therefore to incorporate in the mixture an excess of ore of at least 75% and preferably 100% or even higher.

The formed bricks are preferably dried, conveniently by means of a drier, so as to expel excessive amounts of moisture and thereby minimize any tendency to crack or disintegrate during the subsequent roasting operation.

The roasting operation is preferably carried out in a direct-fired continuous tunnel kiln having a preheating zone adjacent to its entrance, an intermediate firing zone, and a cooling zone adjacent to its exit. The temperature of the firing zone may be maintained at about 1800° F. and the drafts adjusted to admit a sufficient quantity of air to maintain strongly oxidizing atmosphere. The rate of progress of the bricks through the furnace is determined by the length of time found necessary to obtain an efficient conversion which depends upon the character of the particular charge of bricks. The forming of the bricks with a relatively large percentage of voids and roasting them in a direct-fired tunnel kiln is claimed in our copending application for Method of producing chromates, Serial No. 622,288, filed concurrently, Patent 1,964,719, July 19, 1932, which application may be referred to for a fuller description of the preferred roasting operation.

After roasting, the bricks will be found to have substantially all of their original sodium carbonate content converted into sodium chromate, the percentage of conversion being somewhat dependent upon the amount of excess ore in the bricks before roasting. An excess of ore of 100% should ensure that well over 90% of the sodium carbonate is converted to sodium chromate, so that the brick after roasting is characterized by the substantial absence of unconverted sodium carbonate, and is thus adapted to yield a much purer solution of sodium chromate, upon leaching than are the bricks of any prior proposed processes.

The bricks after being discharged from the furnace, are leached to remove sodium chromate, which will average about 95% of the theoretical equivalent of the available sodium in the original mixture.

After leaching, the residue is dewatered and mixed with an amount of sodium carbonate which, for satisfactory commercial yields may vary from the theoretical equivalent of the residual chromium to 50% of that amount. While the first roasting of the ore has preferably been accomplished without the use of lime, lime is now added to the mixture in preparation for a second roasting. Preferably from 20% to 40% of lime based upon the weight of the residue is added at this stage.

The mixture, containing ore, sodium carbonate and lime is now preferably formed into bricks and roasted a second time preferably as described above. If desired, however, the material may be subjected to this second roasting in the form of a loose mass in a reverberatory furnace, and while subjected to the conventional rabbling operation. In carrying out this second roasting operation, using bricks comprising ore, the amount of sodium carbonate theoretically required to combine with the chromium of the ore, and from 20% to 40% of lime, and roasting at temperatures from 1700° to 2000° F. for a period of approximately six hours, conversions exceeding 75% may be obtained. When using but 50% of the theoretical equivalent of soda, under the same conditions, conversions exceeding 90% may be obtained. These bricks, after coming from the second roasting operation, are then leached to recover sodium chromate. The residue may then be discarded as containing practically no further recoverable chromate.

As a result of the preferred procedure described above, the advantage of handling the material in the form of bricks is fully attained, but unlike prior proposals to roast bricks, the chemical efficiency of the process is such as to render it commercially and economically practicable. The feature of using a large excess of ore in the bricks of the first roasting stage is highly desirable in permitting lime to be dispensed with during this stage, while still obtaining a very high percentage of conversion of the sodium carbonate constituent, the ore apparently performing the necessary functions of the lime during the first roasting operation. We are unable definitely to describe the action of lime as universally used in the formation of sodium chromate, but we do know that in prior commercial practice a large quantity of lime has been necessary for good yields. Now, by incorporating the large excess of ore in the bricks of the first roasting stage, and eliminating lime in this stage, several disadvantages of lime may be eliminated in this first stage. The cost of the process is reduced by the use of a reasonable excess of ore as a replacement for the lime such excess of ore being utilized for its chromium content. Hitherto, in the customary furnacing processes the use of lime has resulted in the formation of a measurable quantity of volatile chromium compounds which have been carried away by the furnace gases as the charge was rabbled; this effect is avoided by the preferable use of the large excess of ore and substantially no lime and the roasting of the charge in the form of bricks of the first stage of my process.

We regard lime as an agent especially adapted for use in promoting the removal of the final portions of chromium from the ore, and particularly in removing the portions of chromium which are least amenable to treatment by sodium carbonate.

Chrome ore appears to contain, in addition to ferrous chromate, varying proportions of complex chromium compounds some of which are much less readily converted than is ferrous chromite. It is reasonable to suppose that one action of lime in promoting efficient yields, is to take part in a chemical reaction involving these complex chromium compounds, thus converting the chromium of some of these complex compounds which might not be converted by sodium carbonate alone when the material is roasted in the form of a brick.

We deem it desirable to utilize the large excess of ore to promote the efficient conversion of sodium carbonate in the roast of the initially formed bricks; this presumably effects a concentration of the more complex chromium compounds, which are less amenable to treatment, in the material to be roasted a second time. Then, after having advantageously converted the most reactive chromium constituents and obtained practically complete conversion of the initial quantity of sodium carbonate without having to employ lime, the second or final roasting, with lime, then constitutes a more drastic treatment than is required for the conversion of the less complex chrome minerals, and insures the practical completion of the conversion of the more refractory and less readily converted chromium constituents of the ore.

It should be understood that the present disclosure is for the purpose of illustration only and that this invention includes all modifications and equivalents which fall within the scope of the appended claims.

We claim:

1. A porous brick comprising a mixture of a suitable carbonate and chrome ore in an amount at least 75% in excess of the theoretical equivalent of the carbonate, said brick being adapted to retain its shape under roasting conditions and containing at least 30% of voids.

2. Process of making sodium chromate which comprises preparing a mixture consisting of an alkaline compound of sodium and chrome ore in an amount approximately 100% or more in excess of the theoretical equivalent of the available sodium, forming said mixture into porous briquettes having at least 30% voids, roasting the briquettes in an oxidizing atmosphere, leaching the roasted briquettes to extract the sodium chromate, mixing the leached residue with an additional amount of an alkaline compound of sodium not exceeding the theoretical amount required to combine with the residual chromium, together with a substantial quantity of lime, forming the mixture into porous briquettes having at least 30% voids, and subjecting the briquettes to a further roasting and subsequent leaching to recover the residual chromium.

3. Process of making sodium chromate from chrome ore which comprises: First, removing the less refractory chromium compounds from the ore by roasting a briquetted mixture containing at least 30% voids and consisting of an alkaline compound of sodium and chromite ore in an amount approximately 100% in excess of the theoretical equivalent of available sodium, and leaching the roast; and second, removing the remaining chromium compounds from the leached residue by roasting a briquetted mixture containing at least 30% voids and consisting of said residue, an alkaline compound of sodium, and a substantial amount of lime, and leaching the second roast.

JOHN B. CARPENTER, Jr.
EARL P. STEVENSON.